(12) United States Patent
Nelson et al.

(10) Patent No.: US 12,465,449 B2
(45) Date of Patent: Nov. 11, 2025

(54) ARTICULATED INSTRUMENT WITH SIMPLE FABRICATION

(71) Applicant: NUtech Ventures, Lincoln, NE (US)

(72) Inventors: Carl A. Nelson, Lincoln, NE (US); Monica Bomze, Mooresville, NC (US)

(73) Assignee: NUtech Ventures, Lincoln, NE (US)

( * ) Notice: Subject to any disclaimer, the term of this patent is extended or adjusted under 35 U.S.C. 154(b) by 751 days.

(21) Appl. No.: 17/719,585

(22) Filed: Apr. 13, 2022

(65) Prior Publication Data
US 2022/0323091 A1 Oct. 13, 2022

Related U.S. Application Data

(60) Provisional application No. 63/174,172, filed on Apr. 13, 2021.

(51) Int. Cl.
*A61B 34/00* (2016.01)
*A61B 17/00* (2006.01)
*B25J 9/06* (2006.01)
*B25J 9/10* (2006.01)

(52) U.S. Cl.
CPC .............. *A61B 34/71* (2016.02); *B25J 9/065* (2013.01); *B25J 9/104* (2013.01); *A61B 2017/00314* (2013.01); *A61B 2017/00323* (2013.01); *A61B 2017/00526* (2013.01)

(58) Field of Classification Search
CPC .......... A61B 17/29; A61B 2017/00314; A61B 2017/00323; A61B 2017/00526; A61B 2017/2908; A61B 34/71; B25J 9/065; B25J 9/104
See application file for complete search history.

(56) References Cited

U.S. PATENT DOCUMENTS

| | | | |
|---|---|---|---|
| 2016/0318194 A1* | 11/2016 | Onal | B62D 57/032 |
| 2017/0014998 A1* | 1/2017 | Langenfeld | B25J 9/06 |
| 2022/0110619 A1* | 4/2022 | Zhao | A61L 24/0094 |

* cited by examiner

*Primary Examiner* — Minnah L Seoh
*Assistant Examiner* — Gregory T Prather
(74) *Attorney, Agent, or Firm* — Leydig, Voit & Mayer, Ltd.

(57) ABSTRACT

An articulated instrument and method of its manufacture includes a plurality of segments connected to one another end-to-end, each having a hollow tubular shape defined by a wall, the wall comprising three or more rectangular panels connected along their respective edges at acute angles. A plurality of tendons extends at least partially through the plurality of segments and is configured to apply tension that selectively causes two adjacent segments from the plurality of tendons to bend relative to one another along a pivot joint disposed between the two adjacent segments. The plurality of segments is formed by staggered rectangular portions of a single sheet of stock material, each rectangular portion being folded to form the hollow tubular shape and connected to an adjacent rectangular portion by a tab, each tab defining a respective pivot joint.

15 Claims, 5 Drawing Sheets

ARTICULATED INSTRUMENT WITH SIMPLE FABRICATION

CROSS-REFERENCE TO RELATED APPLICATIONS

The present application claims the benefit of U.S. Provisional Patent Application No. 63/174,172, filed on Apr. 13, 2021, which is incorporated herein by this reference in its entirety for all purposes.

BACKGROUND OF THE INVENTION

Various applications in the fields of medical procedures, manufacturing, laboratory processes, parts assembly, motion simulators, and the like use linkages that are manually or mechanically operated to isolate an environment in which the linkages are working from the surrounding environment. For example, certain laboratory or clean room operations require manipulation of objects in a sterile environment created within an enclosure. The manipulation of these objects is effected by a machine or a user operating outside of the enclosure through the use of a linkage that is disposed in the enclosure but controlled externally to the enclosure. Another example involves laparoscopic surgery and medical procedures, which involve use of a camera or medical instrument disposed as an end effector on the tip of a mechanical linkage that is inserted into the patient to perform the procedure. In a typical configuration, laparoscopic instruments may be operated by a physician or a robot situated next to the patient in the operating room and controlling the linkage to carry out the procedure. The linkage is inserted into the body of the patient through a small incision.

The present disclosure focuses on a linkage for use in laparoscopic applications and a variety of other applications such as remote manipulation of objects in a laboratory or cleanroom manufacturing environment, handling of infectious biological or dangerous chemical substances that are isolated in enclosures, and the like.

Laparoscopic instruments, discussed as one example, are used for accessing the abdominal cavity under a minimally invasive paradigm, and have laid groundwork for extensive development and innovation since their introduction a few decades ago. The most basic version of a laparoscopic tool is essentially a small grasper or other open/close type instrument at the end of a long, hollow shaft through which the tool actuation is achieved, generally using a push-rod. The surgeon manipulates the instrument through an access port called a trocar, which allows a translational degree of freedom along the tool shaft and a rotational degree of freedom about the shaft axis, and the open/close actuation is achieved with a scissors-like handle. The inherent flexibility of the tissue in which the trocar is anchored allows two additional rotational degrees of freedom centered at or near the skin incision, giving the instrument four degrees of freedom overall.

Although most laparoscopic instruments in current clinical use are very similar to this basic 4-DOF (four-degree-of-freedom) instrument, the desire for full mobility (6 DOF) has spurred designers to develop tools with added articulation. Recently, at least 10 instruments with articulated tips were identified. Most of these are driven by movement of the handle relative to the shaft of the tool; these include Real-Hand (Novare Surgical Systems), FlexDex (FlexDex Surgical), and Maestro (Vanderbilt University), to name a few. Recognizing that this relative motion can be very demanding and fatiguing from an ergonomics perspective, in medical and other applications, tools with a small trackball or joystick integrated on the handle were also developed, such as Intuitool. The concept of a "control point" has been introduced, similar to a rotation center in kinematics, which is a point about which the surgeon's motion is reflected to or reproduced at the tool tip. The Da Vinci Surgical System is an example of a robotic system in which this principle is applied; with the hand inserted in the input device, the thumb and finger serve as control points to orient the grasper jaws. However, aggregating multiple degrees of freedom at a control point carries disadvantages. This can be thought of as articulating the tip of an instrument as opposed to distributing the articulation at various points throughout its length at different discrete joints.

One limitation of most of these devices (both manual and robotic instruments) is that straight-line access to the surgical site tends to be required, and the instrument articulations cannot be used to maneuver the instrument around obstacles that may be located along this straight line. Recognizing this, small articulated serial robots for surgery have been developed. It should be noted that manual instruments with distributed articulations seem to be conspicuously absent. This is largely due to the difficulty of designing input mapping mechanisms for the user to control such an instrument, and consequently the solutions seen in the literature which use this approach are robotic. (This does not consider backbone-type instruments, whose articulations are distributed along the continuum of the instrument but provide relatively little overall mobility in terms of effective degrees of freedom). Although surgical robots can extend capabilities by enhancing dexterity compared to manual surgical instruments, one of the barriers to their use is cost.

BRIEF SUMMARY OF THE INVENTION

The present disclosure describes systems and methods for fabricating inexpensive, disposable, articulated instruments. In one exemplary embodiment, the articulated instruments are configured for use in minimally invasive laparoscopic (MILS) surgery applications, but other uses are contemplated. The construction is based on Japanese paper arts. Building on the literature covering the kinematics of origami, an articulated instrument design with antagonistic tendon actuation is described. A general method for achieving a fixed motion scaling ratio in these types of systems is also presented. Kinematic simulations and prototyping demonstrate feasibility of this concept.

The present disclosure further describes disposable robot designs using tendon-drive approaches for various applications. The advantages of distributed degrees of freedom are leveraged while circumventing the cost-driving challenges of fitting precision robotic components inside the inserted robot. In short, the kinematic architecture resembles known insertable robots for medical procedures, while the drive system bears more similarity to tendon-transmissions, allowing the inserted portion of the robot to be inexpensive and disposable.

The systems and methods described herein are in some general ways similar to the application of Japanese paper-folding arts (origami and kirigami) to create structures, but applied to medical devices. There have been past attempts to apply origami to numerous medical applications, notably including laparoscopic grippers, which is one of the few devices that uses direct mechanical actuation as opposed to chemical- or temperature-induced self-deployment.

In one exemplary but non-limiting aspect, the present disclosure describes a manual laparoscopic instrument with distributed degrees of freedom that further reduces cost and complexity by adopting a kirigami-based design. A scheme for direct manual control by the surgeon, which allows motion scaling, is also described.

In one embodiment, biocompatible, laser-cutter compatible, affordable, and adequately stiff plastics are utilized to construct an instrument. Depending on the application, an optimal thickness of material may be selected based on its deflection under bending and torsion loads, and its durability. Single-bar linkages are used for deflection of the instrument. In one embodiment, 5N (approximately 500 g) of loading is applied to the end of a linkage to simulate a maximum load experienced at the tool tip during MILS. Nominal thicknesses of 0.02, 0.03, and 0.04 in (0.508, 0.762, and 1.016 mm) can be used for operating loads from 100 to 500 g. In one embodiment, each linkage can acceptably deflect no more that 3 mm under tip load (bending) and 5 degrees angularly under an offset (torsion) load, but other values can be used depending on application. The durability of material thicknesses was assessed by bending 5 mm wide strips of plastic from 0 to 90, 120, 150, and 180 degrees and counting the number of full movements before the plastic completely failed. 400 cycles of movement is considered adequate for a single-use disposable device for one contemplated embodiment.

DETAILED DESCRIPTION OF THE INVENTION

The present disclosure is directed to articulated instruments, their manufacture, and methods for their use. The systems and methods in accordance with the disclosure are consistent with and, in important respects, build upon previously proposed systems and methods. The articulated instruments in accordance with the present disclosure include an articulated serial kinematic chain of linkages, which provide distributed DOFs. The links are motively connected to one another in series and their individual motion is tendon-driven. The materials used to fabricate the articulated surgical instruments in accordance with the disclosure are relatively inexpensive and easy to fabricate. These materials utilize biocompatible materials and are compatible with standard trocars so they can be mounted for use and directly controlled by the user. In the illustrated embodiment, which is exemplary and non-limiting, the articulated instruments are surgical instruments for use by surgeons conducting MILS procedures.

In one embodiment, the fabrication of an articulated surgical instrument involves using planar materials and rapid, inexpensive fabrication processes to construct a serially articulated structure. This is inspired by recent research in the kinematics of origami, which recognizes that folds in origami patterns function as revolute joints, and systems of folds can be used to create complex mechanical systems. As an extension of this idea, kirigami (in which not only folding but also cutting of paper is allowed) can be used to create an object which has localized degrees of freedom (folds) as well as structurally stiff segments. This is done by making a cut/fold pattern in planar material.

Figure 1:
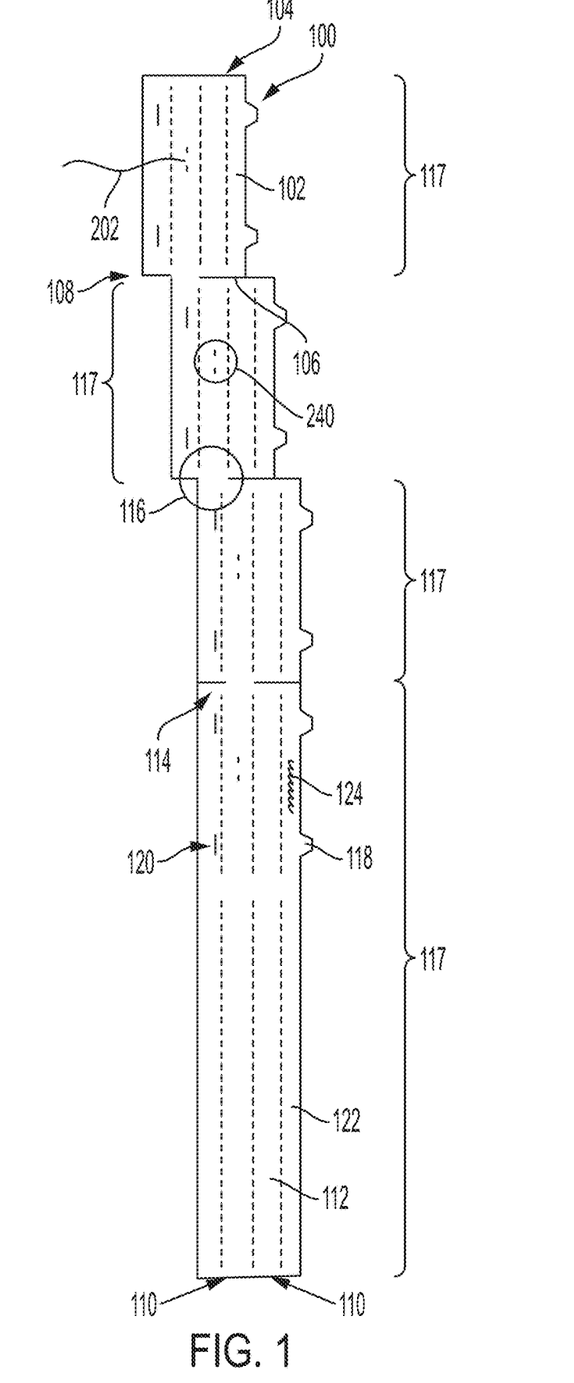
FIG. 1 is an articulated surgical instrument in an unfolded form in accordance with the disclosure.

As shown in FIG. 1, a flat piece of stock 100 was used as the raw material for initial prototyping (although various biocompatible plastics could also be used), and this was laser-cut with dashed-line patterns 102 to generate fold lines 104 and solid-line patterns 106 to define the component boundaries 108. The material used for the stock 100 can be any biocompatible material such as treated paper or plastic. In the illustrated embodiment, the material is plastic that is selected from a suitable list of materials that includes Polyetherimide (PEI), Polyoxymethylene (POM), Polyethylene terephthalate glycol (PETG), and other similar materials, most of which are suitable because they are known to be biocompatible, laser-cut compatible, adequately rigid, affordable, and commercially available in sheets.

A subset of fold lines 110 are used to create rigid subsections 112 from the planar work piece 100, and the remaining fold lines 114 are used as the kinematic joints 116 between these segments 117 (four shown). Various rotation axes are achieved by shifting the relative location of the joint (in the planar pattern) and thereby placing it adjacent to a different facet of the rigid subsection 117. A segment of the device body or structure consists primarily of the single sheet of stock material 100, such as plastic or paper stock, onto which suture thread 202 for tendons is added (see FIG. 4). In alternative embodiments, an internal stiffening structure such as a truss can also be added to improve rigidity of the device segment.

Figures 2A, 2B:
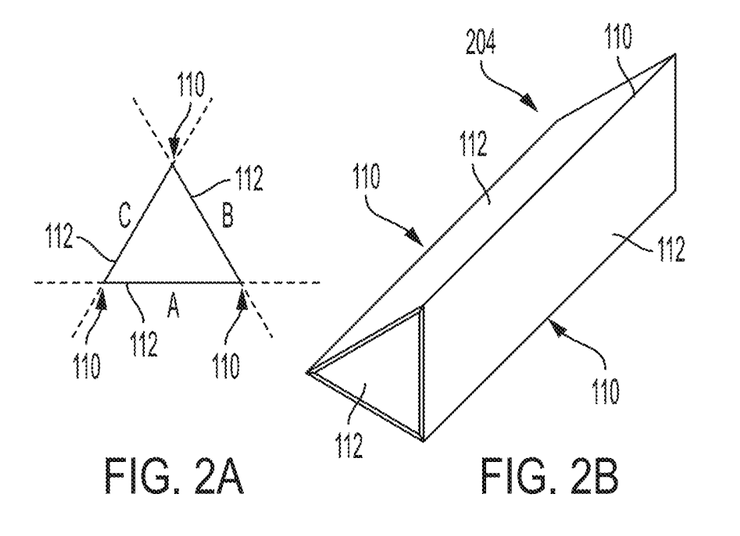
FIG. 2A is a schematic representation of a prism having three possible folding axes.
FIG. 2B is a triangular prism link, in accordance with the disclosure.

The assembly or fabrication includes attaching suture thread 202 or another fiber that can apply tension to the stock 100 with knots or other attachment mechanisms such as with fasteners or adhesives at predetermined, laser-cut openings 240 along one of the rigid subsections 112. Each segment 117 is folded into its three-dimensional form to form a link 204 shaped like a prism, as shown in FIGS. 2A and 2B, and secured in place (e.g., with adhesive) to ensure rigidity of the link segment 117. The process is repeated to construct a plurality of segments 117, which are then connected end to end with the tendons or threads extending through all.

For the sake of simplicity, the same triangular-prism form was adopted for each link in the serial chain (i.e., after folding, each segment has the same triangular cross-section), as shown in FIGS. 2A and 2B. Other shapes can also be used, for example linkages with square, hexagonal and other polygonal cross sectional shapes. The triangular prism was chosen to illustrate in the exemplary embodiments because it can be easily formed by folding, and it has significant axial, bending and torsional stiffness compared to other cross-sections.

In the illustrated embodiment, interlocking "cereal boxtop" tabs 118 are inserted into slits 120 when a locking segment 122 is folded around the remaining segments 117, so that the folded shape can be retained in its stiffened form. The adhesive 124 can be applied to the locking segment 122 and adhere the same to the opposed segment 117 when the linkage is in the prismatic shape shown in FIG. 2B. In the resulting structure, hollow tube-like linkages are formed that include a central bore that is generally devoid of structure and that can be used to route conduits to operate an end-effector such as optical fibers for video applications, electrical conductors for information and power to the end-effector, liquid conduits, pneumatic conduits and the like.

Additional isolated cuts 240 that are staggered along with the segments 112 allow attachment and/or routing of additional tendons made from suture thread 202. Based on the triangular-prism design described herein, possible revolute joint orientations exist at the tip of each link segment at orientation increments of 120 degrees. In the embodiment shown, three discrete choices of joint orientation, each corresponding to an edge of the prism, are defined as shown in FIG. 2A.

It should be appreciated that that flexion of each joint can only occur in one direction (i.e., the range of motion is 0-180 degrees, with 0 measured at the fully straightened position. For example, a 3-DOF articulation (3 joints and 3 link segments) can be constructed. Labeling the joint orientation options as {A, B, C}, there are 33=81 topological possibilities. The trivial case in which all joint axes are parallel (AAA, BBB, and CCC, which would produce only planar motion) can be neglected in this analysis. Many of the possible topologies are mirrors (e.g., ABB mirrors ACC) or rotated duplicates (all Bxx and Cxx topologies are just rotated versions of Axx topologies) of each other. There are four remaining distinct (non-isomorphic) topologies: AAB, ABB, ABA, and ABC.

For this arrangement, standard kinematic transformations were programmed in MATLAB, and joint angles were sampled at 5-degree increments in the range of [0 80] degrees to simulate each configuration. The results of these simulations are shown in FIGS. 6-9 in graphical form.

Figure 3:
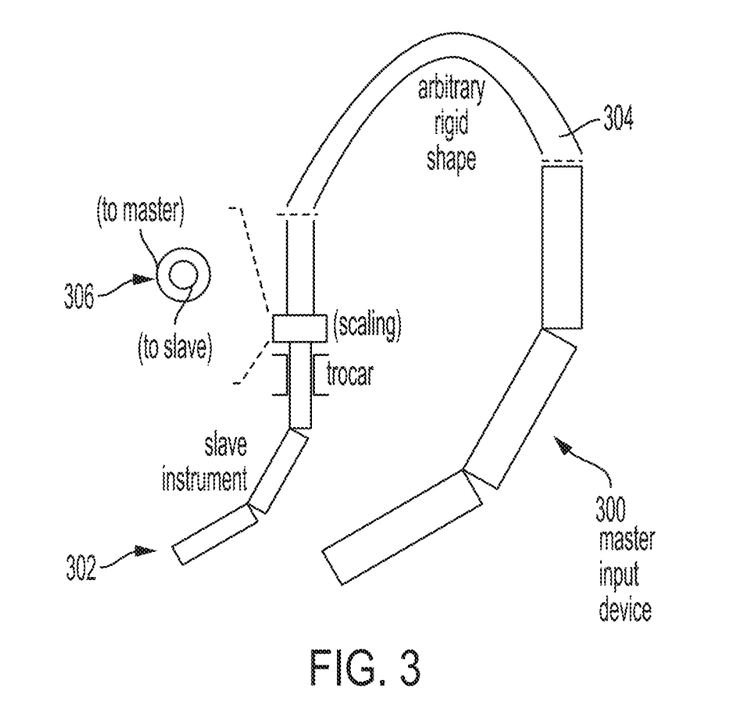
FIG. 3 is a control interface diagram for an articulated surgical instrument in accordance with the disclosure.

For the control interface, the essence of a direct-drive user interface for a surgical instrument is that when the input moves, the output should move similarly. One of the issues with some articulated instruments is mirrored motions (the output moves in the opposite direction of the input), which increases cognitive load for the operator. Another desirable feature is motion scaling, to allow the operator to move their hands at a large length scale and cause movement of an instrument at a smaller length scale. To accomplish these objectives, the proposed arrangement in accordance with an embodiment is shown in FIG. 3.

With all dimensions of the master (input) 300 scaled linearly to those of the slave (output) 302, any nonlinearity inherent in the kinematics (e.g., tendon displacement vs. joint angle) is replicated on both the input and output sides, and the overall scaling remains linear. Furthermore, any section of the tendon path which remains constant (e.g., the arbitrarily shaped section 304 shown in FIG. 3 leading outside the patient to the master device) does not affect the tendon kinematics mapping.

Therefore, a linear scaling device 306 that includes, e.g., pulleys, gears, and the like, and that is situated between the master 300 and slave 302 is sufficient to achieve the objective. One simple arrangement is a compound pulley or spool, with the input tendon wound on the large side of the spool and the output tendon wound on the small side; the scaling ratio (relative size of master to slave, and associated scaling of input/output motions) is equal to the ratio of spool diameters. Each tendon needs its own spool, so for the 3-DOF articulation described above, and antagonistic tendons for flexion/extension, this results in a set of six compound spools to be arranged between the master and slave. Surgeon control is achieved by directly manipulating the end of the master instrument, i.e., applying the "control point" approach similar to what has been proposed in the past.

Figure 4:
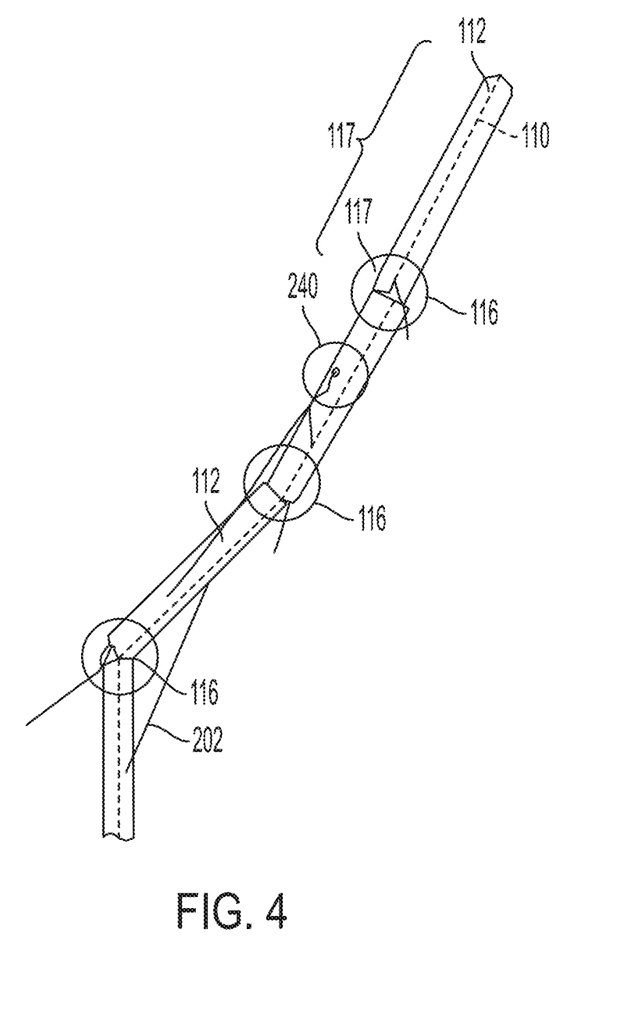
FIG. 4 is a photo of a portion of an articulated surgical instrument in accordance with the disclosure.
Figure 5:
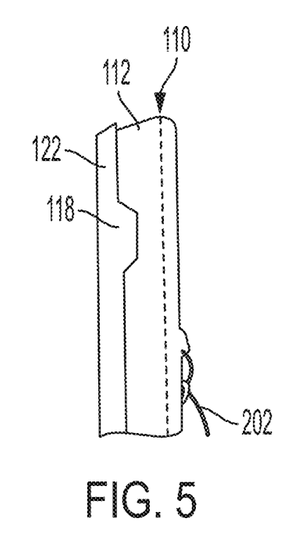
FIG. 5 is an enlarged detail view of the articulated surgical instrument of FIG. 4.
Figure 6:
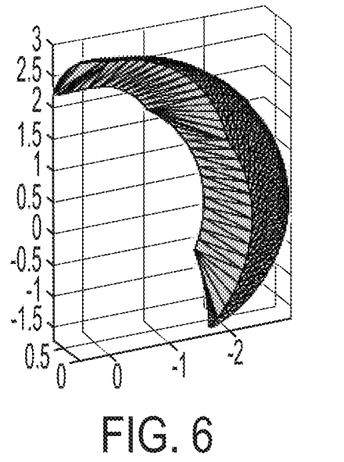
FIGS. 6-9 are graphical representations of workspace volumes of four non-isomorphic, 3 degree-of-freedom (DOF) configurations for articulated surgical instruments in accordance with the disclosure.
Figure 7:
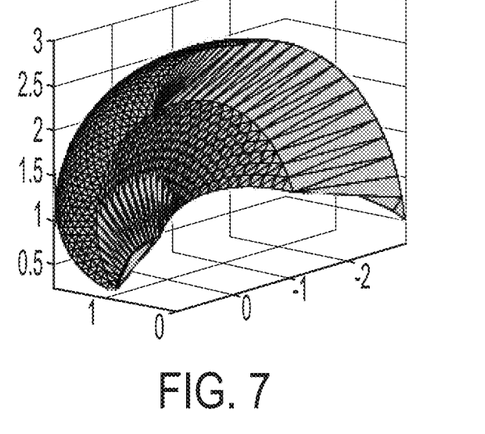
Figure 8:
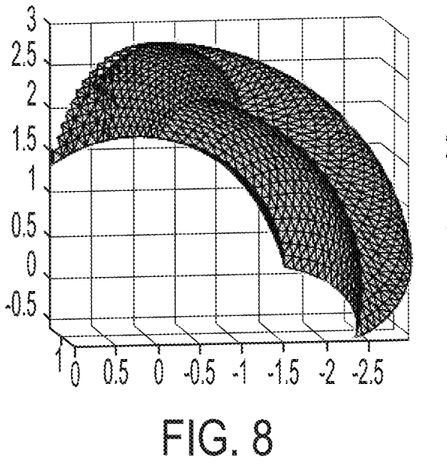
Figure 9:
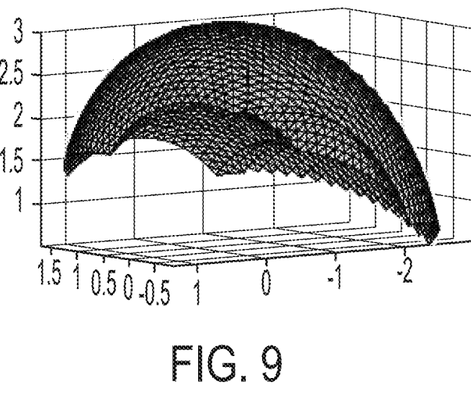

The laser-cut paper prototype based on the pattern of FIG. 1 is shown in FIG. 4. In the illustrated embodiment, the triangle side length is 5 mm, allowing it to easily fit through standard trocars. Fabrication can be achieved in a matter of minutes at extremely low cost (<<1 USD). Six tendons 202 connect (with simple knots) to link segment midpoints (for flexion) or to corners opposite the respective joints (for extension). All tendons route internally through to the base of the prism. The relative simplicity of the design and the relatively open space within the hollow prism produce low friction and smooth motions when antagonistically actuating the tendons.

Using MATLAB, the alphaShape( ) function was used to convert the point cloud data resulting from kinematic simulations of the instrument to a meshed volume for workspace visualization. The results for the four non-isomorphic configurations are shown in FIGS. 6-9. Although the workspaces are similarly shaped, it can be seen that the "ABC" configuration (in which a different joint axis is used at each segment—consistent with the "shifted" segments as shown in FIG. 1) has the largest workspace. This workspace can also be rotated about, and translated along, the trocar axis, and tissue flexibility can also allow some additional rotations at the trocar site, giving the overall system 7 DOF.

This work has shown the feasibility of using kirigami methods to fabricate inexpensive articulated instruments for minimally invasive surgery. However, there is still significant work remaining to demonstrate adequate performance. This includes testing under load to ascertain stiffness properties, integration of an instrument end-effector (potentially leveraging previous work demonstrating origami forceps), and further investigating material options with regard to potential tradeoffs between biocompatibility and performance. Further tradeoffs may also include variations in manufacturing methods (e.g., computer numerically controlled machining, electro-discharge machining, 3D printing, etc.) corresponding to different materials, with associated variations in cost. Additional detailed design work on the scaling mechanism to bring it to the prototyping phase is also needed; as with any antagonistic tendon-driven system, this will also necessarily entail a means of tensioning the cables.

It is contemplated that the device is configured to achieve a range of motion typical of MILS. The range of motion of the device can be characterized by the workspace volume, which is the volume enclosed by all the points reached by the end effector of the device. A large workspace volume indicates that the device won't require straight-line access for procedures and will increase applicable procedures. The workspace volume can be increased by addressing the kinematic singularity that exists in the device shown in FIG. 3 when the joints are bent beyond 90 degrees and the tendons produce a zero moment about their respective rotation axes. An adjustment to the angle of cut in the planar pattern at the joint can creates a protrusion over the joint which will reduce the kinematic singularity and increase the range of motion.

For example, in the embodiment shown in FIG. 3, the linkages have a generally rectangular profile such that, when two segments are aligned, the interface surface between two adjacent segments is generally perpendicular to the aligned centerlines of the two segments. By changing the angle between the interface surfaces and the centerlines to be non-perpendicular, such that the profile of a linkage when viewed from the side resembles an inclined rectangle or a trapezoid, can increase the ability to bend two adjacent segments to an angle of more than 90 degrees, which vastly increases the operating envelope of the device. Such modification of the ends of linkages can be made to all or fewer than all linkage interfaces depending on a desired operating envelope. A partial, cutaway view of an interface 300 between two adjacent linkages 317 is shown in FIG. 10.

Figure 10:
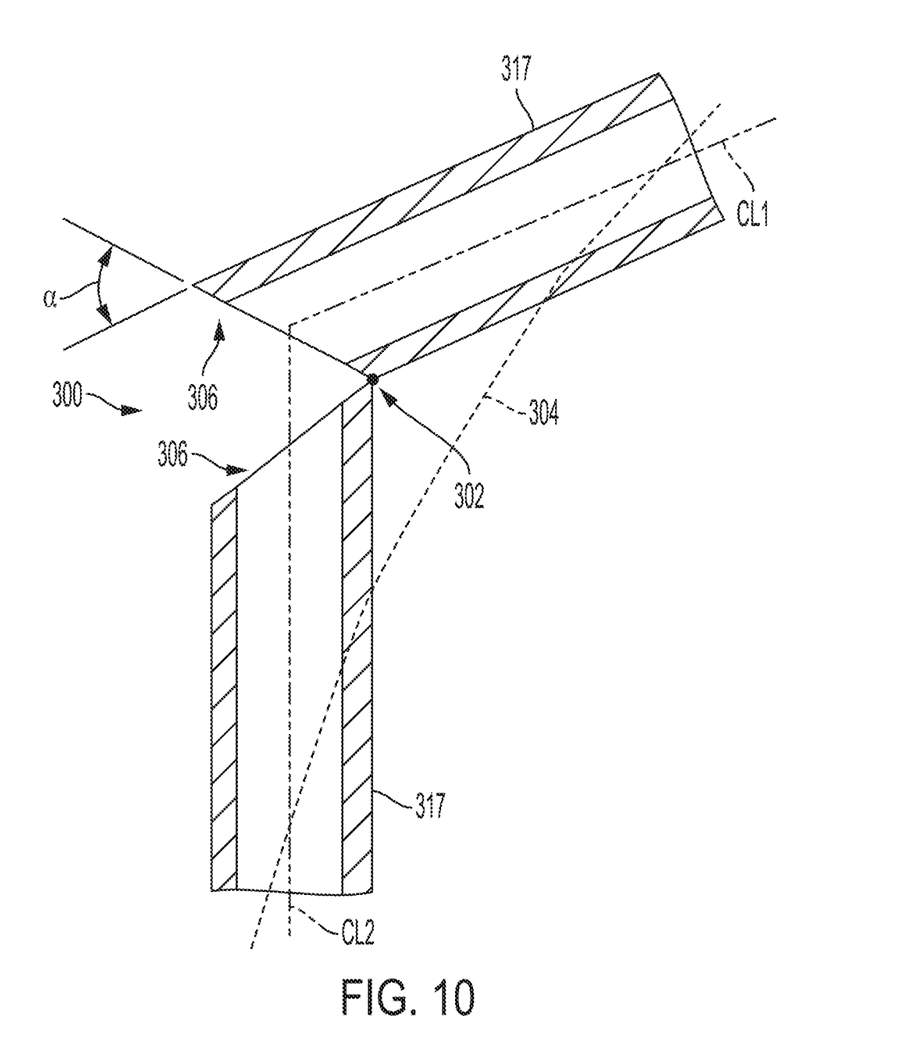
FIG. 10 is a partial segmented view of an interface between adjacent segments in accordance with the disclosure.

In reference to FIG. 10, it can be seen that two adjacent linkages 317 are connected at a pivot 302. A tendon or string 304 extends between the two linkages, as previously described, and is associated therewith such that tension applied to the string causes the linkages to bend about the pivot 302. As can be seen, an interface 306 at the end of each linkage 317 is non-perpendicular relative to CL1 and CL2, which represent the longitudinal centerlines of the linkages 317. In the embodiment shown, the interface 306 forms an angle alpha ($\alpha$) relative to each linkage's respective centerline. Such orientation of the linkage interfaces not only improves the range of motion but also the excursion of the distal arm segment outside the projected cross section of the proximal segment, as well as the joint durability (as a function of range of motion). The range of motion (RoM) can be calculated using geometry relations, such as the equation provided below in Equation 1, as can the excursion of the distal arm when the width of the prism segment w is known, as provided below in Equation 2. The known relationship between range of motion and durability can be used to model the relationship between angle of cut and durability.

$$RoM = 180 - \sin^{-1}\left(\frac{\sin(AoC)}{2}\right) \quad \text{Equation 1}$$

$$Extr = w\left(\sqrt{\frac{1}{\sin^2(AoC)} - \frac{1}{4}} - \sin(60)\right) \quad \text{Equation 2}$$

For performing a kinematic analysis, the applicability of the device to a range of procedures can be assessed by modelling and predicting the device behavior using kinematic analysis. Classical Jacobian kinematic relationships and tendon force equations from static equilibrium can be used to model the torques experienced in each of the joints and the forces experienced in each of the extension tendons for a specified motion with a given tip load. This information can be used to predict whether the device is suitable for a given procedure. These models can be built and verified in a widely accessible program such as MATLAB (Mathworks). A Jacobian matrix can be described as the transform matrix between the velocity of the joint angles of the device and the velocity of the end effector, as shown below in Equation 3, where the position and orientation vector of the device is T and the joint angles are $\theta$.

$$J = \left[\frac{\partial(T_i)}{\partial(\theta_i)}\right] \quad \text{Equation 3}$$

Following this, the torque at each joint of the device $\tau$ and the force experienced in each extension tendon F can be found using Equations 4 and 5, provided below, where the force experienced at the end effector is P and the distance of the tendon from the joint is r.

$$\tau = J^T P \quad \text{Equation 4:}$$

$$F = \tau/r \sin\theta \quad \text{Equation 5:}$$

The device in accordance with the disclosure is compatible with commonly used end-effectors and is thus configured to perform MILS procedures. Common end-effectors include cautery, graspers, and scissors, which perform various functions during MILS procedures.

In one embodiment, PETG is selected as the most suitable material since the melted edges have no functional impact during assembly, and it does not appear to burn or otherwise chemically change during manufacturing, and it is able to produce functional joints.

To ensure motion transmission through all of the tendons, tension is maintained equally in all tendons. This balancing of tensions is extremely delicate can result in lost motion if done incorrectly. The solution requires additional input force as the tension in the antagonist tendons needs to be overcome to create any motion. The tension in the tendons can be initially created using weights hung on the spool, wound in the direction opposite to the device tendons. To make the device more compact, torsional springs are used instead of the weights. The change in spring length as it is wound and un-wound pushes and pulls the connected spools, changing the tension of the attached tendons and upsetting the tension balance. Constant-force springs are attached similarly to the weights with an additional axle at the rear of the device. This provides a constant unidirectional force.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An articulated instrument, comprising:
    a plurality of segments, each of the plurality of segments having an elongate shape defining first and second ends, wherein the plurality of segments are connected to one another end-to-end along their respective first and second ends;
    wherein each of the plurality of segments has a hollow tubular shape defined by a wall, the wall comprising three or more rigid subsections that are each planar rectangular panels connected along respective subsection fold lines;
    a tendon extending at least partially through the plurality of segments, the tendon configured to apply tension that selectively causes two adjacent segments from the plurality of segments to bend relative to one another along a pivot joint disposed between the two adjacent segments;
    wherein the plurality of segments is formed by a single sheet of stock material separated into the three or more rigid subsections by the respective subsection fold lines, each of three or more rigid subsections being folded about a respective subsection fold line to form the hollow tubular shape, and each of the plurality of segments being connected to an adjacent one of the plurality of segments by a kinematic fold line defining the respective pivot joint.

2. The articulated instrument of claim 1, wherein the sheet of stock material is made from plastic.

3. The articulated instrument of claim 1, wherein each of the respective subsection fold lines includes perforations, and wherein each three or more rigid subsections is folded along the perforations to form the hollow tubular shape.

4. The articulated instrument of claim 1, wherein the tendon is made from surgical thread.

5. The articulated instrument of claim 1, further comprising a spool associated with the tendon, wherein the spool selectively applies or relieves tension to the tendon to move a free end of the tendon, the free end disposed at the first or second end of an outermost segment from the tendon.

6. The articulated instrument of claim 5, further comprising an end-effector disposed at the free end.

7. The articulated instrument of claim 1, wherein each of the rectangular sections further comprises locking tabs and corresponding slots, and wherein the hollow tubular shape is secured by securing the locking tabs into the corresponding slots.

8. The articulated instrument of claim 1, wherein at least one of the three or more rigid subsections of the segments includes an interface extending at a non-perpendicular angle with respect a centerline of the hollow tubular shape of the segment.

9. A method for fabricating an articulated instrument, comprising:
    providing a sheet of stock material;
    cutting the sheet of stock material into a shape that includes a plurality of rigid subsections that are each planar rectangular panels;
    folding each of the plurality of rigid subsections to form a plurality of segments, each of the plurality of segments having a hollow tubular shape with a polygonal cross section shape defined by a wall comprising three or more of the rigid subsections that are each connected along a set of respective subsection fold lines;
    wherein, when folded, each of the plurality of segments having an elongate shape defining first and second ends, wherein the plurality of segments are connected to one another end-to-end along their respective first and second ends by a kinematic fold line, each kinematic fold line defining a respective pivot joint;
    connecting a tendon extending at least partially through the plurality of segments connected end-to-end one to another;
    selectively applying tension to the tendon to cause two adjacent segments from the plurality of segments to bend relative to one another along the respective pivot joint.

10. The method of claim 9, wherein the sheet of stock material is made from plastic.

11. The method of claim 9, wherein each of the respective subsection fold lines includes perforations, and wherein each of the three or more rigid subsections are folded along the perforations to form the hollow tubular shape.

12. The method of claim 9, wherein the tendon is made from surgical thread.

13. The method of claim 9, further comprising providing a spool associated with the tendon, selectively applying or relieving tension to the tendon to move a free end of the tendon, the free end disposed at the first or second end of an outermost segment from the tendon.

14. The method of claim 13, further comprising providing an end-effector disposed at the free end.

15. The method of claim 9, wherein the wall of each of the segments further comprises a locking tab and a corresponding slot, and wherein the method further comprises forming the hollow tubular shape by securing the locking tab into the corresponding slot.

* * * * *